(12) United States Patent
Sanders

(10) Patent No.: X1432
(45) Date of Patent: Feb. 7, 1811

(54) DISTILLING SPIRITS FROM CORN STALKS

(76) Inventor: John Sanders

The Schedule referred to in these Letters patent and making part
of the same containing a description in the words of the said John Sanders himself of [illegible]
[illegible] of making [illegible] spirits out of the juice of the [illegible] corn stalks [illegible]
denominated the horse tooth or Virginia corn.

Description of the Machinery used and requisite for extracting the [illegible]
and [illegible] the same; consist of a frame seven feet six inches long [illegible]
and twenty [illegible] wide the perpendicular pieces of the same [illegible]
[illegible] into timbers laying horizontal and fastened by a strong
key. in this frame are placed four nuts or cylinders turned very true [illegible] inches
in diameter, twenty seven inches in length except one, which is six feet long, [illegible]
the [illegible] at the top, four inches of each end of the nut is turned [illegible]
diameter, the long nut to receive the necks, these are banded with iron to prevent [illegible]
[illegible] in the semicircular cast blocks [illegible] they are keyed up below the upper [illegible] the nuts
[illegible] inches in length are turned down to fifteen inches diameter, to receive the cogs [illegible]
[illegible] an iron band [illegible] to secure the nuts from cracking, both the horizontal and perpen-
dicular pieces of the frame are secured by [illegible] iron screw bolts passing through [illegible]
[illegible] when the nuts are placed in the frame [illegible] are [illegible] perpendi-
cular through the upper and lower horizontal pieces, to aid the lower piece in supporting the
weight of the nuts crank or sweep [illegible] horses or one yoke of oxen are requisite to work
the mill. There are also two semicircular blocks one [illegible] of an inch larger in cir-
cumference than the nuts, one is placed before the second nut [illegible] the stalks passing the
first conveys them into the next the other is placed on the opposite side before the third nut
[illegible] conveys [illegible] into the [illegible] after [illegible] which, it is [illegible] and ready for
the press. The press consists of two square frames [illegible] feet wide about the same hight
these frames are placed perpendicular about [illegible] feet [illegible] the upper pieces [illegible]
[illegible] each two sockets or screw nuts cut in them for the screws to work into, the screws
are four in number [illegible] inches in diameter and about seven feet in length [illegible]
[illegible] are left [illegible] where each has small mortices to receive a lever or iron crow [illegible]
to [illegible] the screws [illegible] place strong iron bands are fixed the four screws are brought
[illegible] equally, their points are [illegible] work in the steeled [illegible] fixed in the [illegible]
[illegible] with [illegible] and [illegible] the remaining [illegible]
through the mills, and contains a much larger portion of the saccharine principle than
[illegible] the rest of the process is [illegible] fermentation and distillation Signed in the presence of
[illegible] Sanders
P. V. Rensselaer John Sanders